US009356530B2

(12) United States Patent
Tanifuji

(10) Patent No.: US 9,356,530 B2
(45) Date of Patent: May 31, 2016

(54) DC-DC CONVERTER AND SEMICONDUCTOR INTEGRATED CIRCUIT

(71) Applicant: Kabushiki Kaisha Toshiba, Minato-ku, Tokyo (JP)

(72) Inventor: Ryo Tanifuji, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 96 days.

(21) Appl. No.: 14/478,873

(22) Filed: Sep. 5, 2014

(65) Prior Publication Data

US 2015/0256066 A1    Sep. 10, 2015

(30) Foreign Application Priority Data

Mar. 10, 2014 (JP) ................. 2014-046220

(51) Int. Cl.
*H01B 3/00* (2006.01)
*H02M 3/335* (2006.01)
*H02M 1/00* (2006.01)
*H02M 1/32* (2007.01)

(52) U.S. Cl.
CPC .. *H02M 3/33592* (2013.01); *H02M 2001/0054* (2013.01); *H02M 2001/325* (2013.01); *Y02B 70/1475* (2013.01); *Y02B 70/1491* (2013.01)

(58) Field of Classification Search
None
See application file for complete search history.

(56) References Cited

U.S. PATENT DOCUMENTS

| 5,289,361 A * | 2/1994 | Vinciarelli | .......... H02M 1/4225 323/222 |
| 8,373,397 B2 | 2/2013 | Tanifuji et al. | |
| 2011/0085356 A1* | 4/2011 | Morota | .................... H02M 1/44 363/21.04 |
| 2014/0071715 A1* | 3/2014 | Sato | .................. H02M 3/33515 363/21.01 |
| 2014/0078798 A1* | 3/2014 | Turchi | ................. H02M 1/4225 363/89 |
| 2014/0125299 A1* | 5/2014 | Barth | ................... H02M 3/1584 323/266 |
| 2014/0160808 A1* | 6/2014 | Sato | .................. H02M 3/33507 363/21.02 |
| 2014/0191743 A1* | 7/2014 | O'Driscoll | ............ H02M 3/156 323/282 |
| 2014/0226369 A1* | 8/2014 | Kimura | ............... H02M 3/3376 363/21.09 |
| 2014/0253181 A1* | 9/2014 | Mukherjee | .......... H02M 3/1563 327/109 |
| 2014/0285100 A1* | 9/2014 | Akahoshi | .............. H02M 7/217 315/200 R |
| 2014/0292299 A1* | 10/2014 | Yang | .................... H02M 3/1588 323/288 |

(Continued)

FOREIGN PATENT DOCUMENTS

| JP | H09-266664 A | 10/1997 |
| JP | 2011109806 A | 6/2011 |
| JP | 2012-205365 A | 10/2012 |

*Primary Examiner* — Lincoln Donovan
*Assistant Examiner* — Khareem E Almo
(74) *Attorney, Agent, or Firm* — White & Case LLP

(57) ABSTRACT

In a mode comparator of the DC-DC converter, a threshold input to the mode comparator is switched to a first threshold, if a mode signal prescribes an active mode, on the other hand, the threshold input to the mode comparator is switched to a second threshold, which is higher than the first threshold, if the mode signal prescribes an inactive mode. A lower limit value to a lower limit value setting circuit of the DC-DC converter is switched to a first lower limit value, if the mode signal prescribes the active mode, on the other hand, the lower limit is switched to a second lower limit value, which is higher than the first lower limit value, if the mode signal prescribes an inactive mode.

20 Claims, 5 Drawing Sheets

(56) References Cited

U.S. PATENT DOCUMENTS

| | | | | |
|---|---|---|---|---|
| 2014/0313608 | A1* | 10/2014 | Nakabayashi | H02M 3/1584 360/39 |
| 2014/0328090 | A1* | 11/2014 | Takahashi | H02M 3/33507 363/21.17 |
| 2015/0022174 | A1* | 1/2015 | Nikitin | H02M 3/156 323/282 |
| 2015/0023070 | A1* | 1/2015 | Nate | H02M 3/33507 363/21.17 |
| 2015/0035509 | A1* | 2/2015 | Koyama | H02M 3/157 323/283 |
| 2015/0042299 | A1* | 2/2015 | Li | H02M 1/36 323/271 |
| 2015/0042300 | A1* | 2/2015 | Peker | H02M 3/156 323/274 |
| 2015/0084606 | A1* | 3/2015 | Nakamura | H02M 3/156 323/246 |
| 2015/0155783 | A1* | 6/2015 | Li | H03F 1/0227 323/271 |
| 2015/0256066 | A1* | 9/2015 | Tanifuji | H02M 3/33592 327/109 |
| 2015/0263617 | A1* | 9/2015 | Xue | H02M 3/156 323/271 |
| 2015/0263629 | A1* | 9/2015 | Stuler | H02M 3/33546 363/21.02 |
| 2015/0280557 | A1* | 10/2015 | Xue | H02M 3/33546 363/21.02 |
| 2015/0326123 | A1* | 11/2015 | Fukushima | H02M 3/158 323/271 |
| 2015/0381035 | A1* | 12/2015 | Torres | H02M 3/07 327/536 |

\* cited by examiner

DC-DC CONVERTER AND SEMICONDUCTOR INTEGRATED CIRCUIT

CROSS-REFERENCE TO RELATED APPLICATION

This application is based upon and claims the benefit of priority from the prior Japanese Patent Application No. 2014-046220, filed on Mar. 10, 2014, the entire contents of which are incorporated herein by reference.

BACKGROUND

1. Field

Embodiments described herein relate generally to a DC-DC converter and a semiconductor circuit.

2. Background Art

A DC-DC converter turns on and off one or more switch elements and controls the on/off time (the pulse duty cycle) of a switching pulse so that a desired voltage or current is supplied to a load.

DETAILED DESCRIPTION

A DC-DC converter according to an embodiment includes a coil connected to a first node, to which a pulse signal is supplied, at a first end thereof and to an output terminal at a second end thereof. The DC-DC converter includes a capacitor that is connected between the second end of the coil and a first fixed potential. The DC-DC converter includes a voltage dividing circuit that divides a voltage at the output terminal and outputs a resulting divided voltage. The DC-DC converter includes an error amplifier that receives the divided voltage and a reference voltage, outputs a comparison result signal, which is responsive to a result of comparison between the divided voltage and the reference voltage, to a second node. The DC-DC converter includes a filter circuit that is connected to the second node at a first end thereof and to the first fixed potential at a second end thereof, compensates for a phase of the comparison result signal output from the error amplifier. The DC-DC converter includes a switching controlling circuit that controls a duty cycle of the pulse signal supplied to the first node so as to bring the voltage at the output terminal closer to a target value, based on the comparison result signal. The DC-DC converter includes a mode comparator that receives the comparison result signal and a threshold, outputs a mode signal that prescribes an active mode in which the switching controlling circuit performs an operation of outputting the pulse signal, or the mode signal that prescribes an inactive mode in which the switching controlling circuit stops the operation of outputting the pulse signal, based on the result of comparison between the comparison result signal and the threshold, the mode comparator having a hysteresis characteristic. The DC-DC converter includes a lower limit value setting circuit that sets a lower limit value for the comparison result signal supplied to the second node in accordance with the mode signal and performs control to prevent the comparison result signal from being lower than the lower limit value.

In the lower limit value setting circuit, the lower limit value is switched to a first lower limit value if the mode signal prescribes the active mode, on the other hand, the lower limit value is switched to a second lower limit value, which is higher than the first lower limit value, if the mode signal prescribes the inactive mode.

In the following, embodiments will be described with reference to the drawings.

First Embodiment

Figure 1:
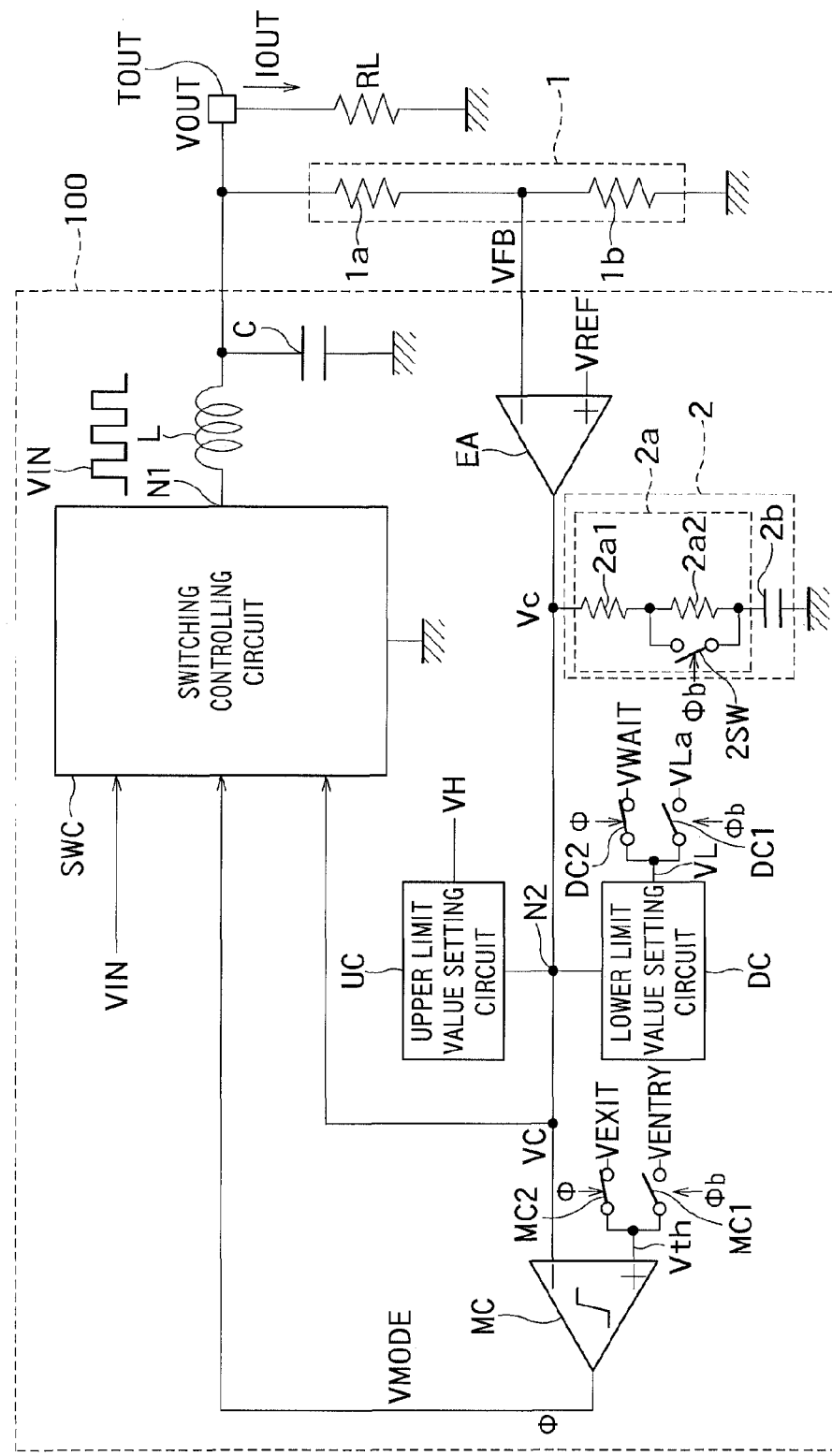
FIG. 1 is a block diagram showing an example of a configuration of a DC-DC converter 1000 according to a first embodiment, which is an aspect of the present invention.
Figure 2:
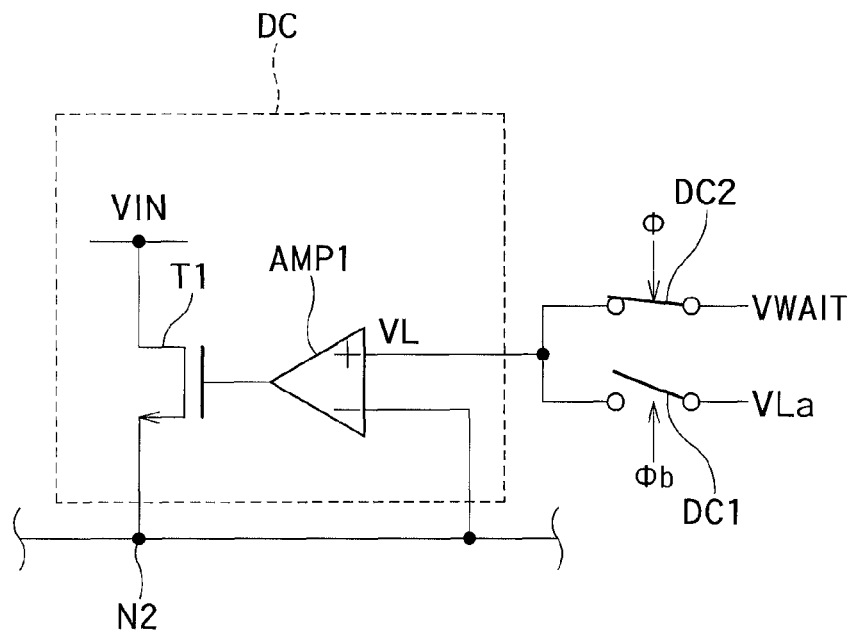
FIG. 2 is a circuit diagram showing an example of a circuit configuration of a lower limit value setting circuit "DC" in the DC-DC converter 1000 shown in FIG. 1.
Figure 3:
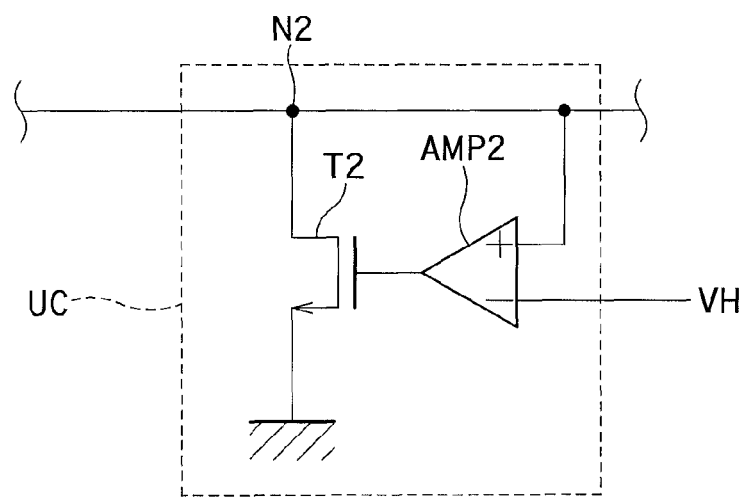
FIG. 3 is a circuit diagram showing an example of a circuit configuration of an upper limit value setting circuit "UC" in the DC-DC converter 1000 shown in FIG. 1.
Figure 4:
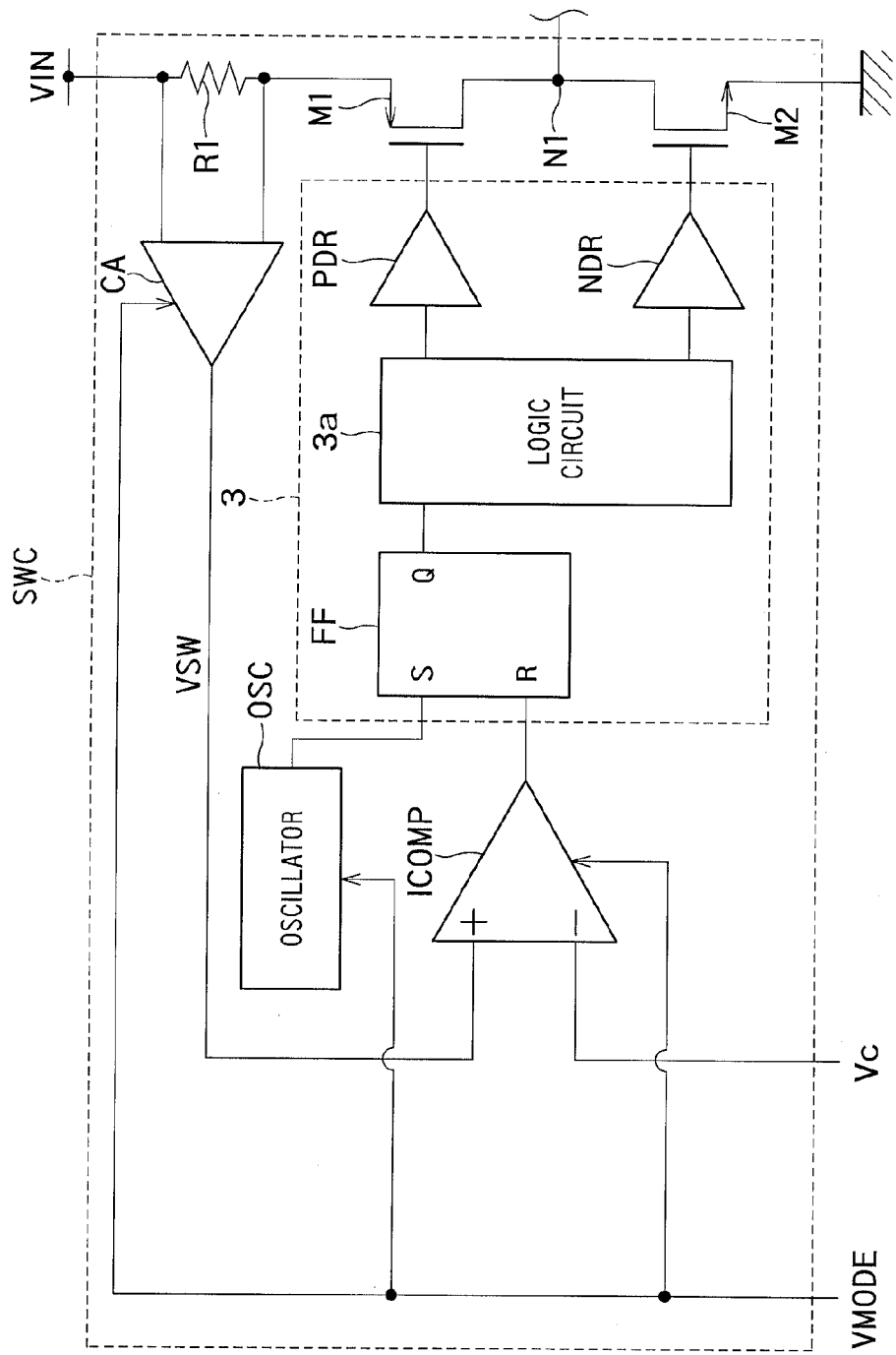
FIG. 4 is a circuit diagram showing an example of a circuit configuration showing a switching controlling circuit "SWC" in the DC-DC converter 1000 shown in FIG. 1.

FIG. 1 is a block diagram showing an example of a configuration of a DC-DC converter 1000 according to a first embodiment, which is an aspect of the present invention. FIG. 2 is a circuit diagram showing an example of a circuit configuration of a lower limit value setting circuit "DC" in the DC-DC converter 1000 shown in FIG. 1. FIG. 3 is a circuit diagram showing an example of a circuit configuration of an upper limit value setting circuit "UC" in the DC-DC converter 1000 shown in FIG. 1. FIG. 4 is a circuit diagram showing an example of a circuit configuration showing a switching controlling circuit "SWC" in the DC-DC converter 1000 shown in FIG. 1.

As shown in FIG. 1, the DC-DC converter 1000 includes a coil "L", a capacitor "C", a voltage dividing circuit 1, an error amplifier "EA", a filter circuit 2, a switching controlling circuit "SWC", a mode comparator "MC", switch elements "MC1", "MC2", "DC1" and "DC2", a lower limit value setting circuit "DC" and a upper limit value setting circuit "UC".

The coil "L" is connected to a first node "N1", to which a pulse signal is supplied, at one end thereof and to an output terminal "TOUT" at another end thereof.

The capacitor "C" is connected between the another end of the coil "L" and a fixed potential (a ground potential in this embodiment, for example).

The voltage dividing circuit 1 divides a voltage "VOUT" at the output terminal "TOUT" and outputs a resulting divided voltage "VFB".

The voltage dividing circuit 1 includes a first voltage dividing resistor "1a" and a second voltage dividing resistor "1b". The first voltage dividing resistor "1a" is connected to the output terminal "TOUT" at one end thereof. The second voltage dividing resistor "1b" is connected between another end of the first voltage dividing resistor and a ground.

In this case, the voltage dividing circuit 1 outputs a voltage at a point between the first voltage dividing resistor "1a" and the second voltage dividing resistor "1b" as the divided voltage "VFB".

The error amplifier "EA" receives the divided voltage "VFB" at an inverting input terminal and receives a reference voltage "VREF" at a non-inverting input terminal. The error amplifier "EA" outputs a comparison result signal "Vc", which is responsive to the result of comparison between the divided voltage "VFB" and the reference voltage "VREF", to a second node "N2".

Specifically, for example, the error amplifier "EA" sets the voltage of the comparison result signal "Vc" higher if the divided voltage "VFB" is lower than the reference voltage "VREF" (if the output voltage "VOUT" is lower than a target value).

On the other hand, the error amplifier "EA" sets the voltage of the comparison result signal "Vc" lower if the divided voltage "VFB" is higher than the reference voltage "VREF" (if the output voltage "VOUT" is higher than the target value).

The mode comparator "MC" receives the comparison result signal "Vc" and a threshold "Vth" and outputs a mode signal "VMODE" based on the result of comparison between the comparison result signal "Vc" and the threshold "Vth". Specifically, the mode comparator "MC" outputs the mode signal "VMODE" (a signal at a "Low" level, for example) that prescribes an active mode in which the switching controlling circuit "SWC" performs an operation of outputting a pulse signal if the comparison result signal "Vc" increases to the threshold "Vth" or higher.

On the other hand, the mode comparator "MC" outputs the mode signal "VMODE" (a signal at a "High" level, for example) that prescribes an inactive mode in which the switching controlling circuit "SWC" stops the operation of outputting a pulse signal if the comparison result signal "Vc" decreases to the threshold "Vth" or lower. In FIG. 1, the mode signal "VMODE" is denoted as a signal "Φ". A signal "Φb" is the signal "Φ" inverted.

The mode comparator "MC" has a hysteresis characteristic. For example, if the comparison result signal "Vc" increases to the threshold "Vth" or higher (in which case, the mode signal "VMODE" prescribes the active mode), the threshold "Vth" input to the mode comparator "MC" is switched to a first threshold "VENTRY" (that is, the switch element "MC1" is turned on, and the switch element "MC2" is turned off).

On the other hand, if the comparison result signal "Vc" decreases to lower than the threshold "Vth" (in which case, the mode signal "VMODE" prescribes the inactive mode), the threshold "Vth" input to the mode comparator "MC" is switched to a second threshold "VEXIT", which is higher than the first threshold "VENTRY", (that is, the switch element "MC1" is turned off, and the switch element "MC2" is turned on). The second threshold "VEXIT" is set lower than an upper limit value "VH".

The filter circuit 2 is connected to the second node "N2" at one end thereof and to the fixed potential (the ground potential as described above, for example) at another end thereof. The filter circuit 2 compensates for the phase of the comparison result signal "Vc" output from the error amplifier "EA". This helps stabilize the operation of a DC-DC controlling loop.

As shown in FIG. 1, the filter circuit 2 includes a compensating resistor "2a" and a compensating capacitor "2b", for example.

The compensating resistor "2a" is connected between the second node "N2" and the fixed potential.

The compensating capacitor "2b" is connected in series with the compensating resistor "2a" between the second node "N2" and the fixed potential.

The compensating resistor "2a" is a variable resistor controlled by the signal "Φb", for example. In this case, the compensating resistor "2a" is composed of resistive elements "2a1" and "2a2" and a switch element "2SW".

For example, in the compensating resistor "2a", if the mode signal "VMODE" prescribes the active mode (in which case, the signal "Φb" is at the "High" level), the resistance of the compensating resistor "2a" is switched to a first resistance (that is, the switch element "2SW" is turned on).

On the other hand, in the compensating resistor "2a", if the mode signal "VMODE" prescribes the inactive mode (in which case, the signal "Φb" is at the "Low" level), the resistance of the compensating resistor "2a" is switched to a second resistance, which is higher than the first resistance (that is, the switch element "2SW" is turned off).

Based on the comparison result signal "Vc", the switching controlling circuit "SWC" controls the duty cycle of the pulse signal supplied to the first node "N1" so as to bring the voltage at the output terminal "TOUT" closer to a target value.

The lower limit value setting circuit "DC" sets a lower limit value "VL" for the comparison result signal "Vc" supplied to the second node "N2" in accordance with the mode signal "VMODE" output from the mode comparator "MC" and performs control to prevent the comparison result signal "Vc" from being lower than the lower limit value "VL".

In the lower limit value setting circuit "DC", if the comparison result signal "Vc" increases to the threshold "Vth" or higher, the lower limit value "VL" is switched to a first lower limit value "VLa" (that is, the switch element "DC1" is turned on, and the switch element "DC2" is turned off).

On the other hand, in the lower limit value setting circuit "DC", if the comparison result signal "Vc" decreases to lower than the threshold "Vth", the lower limit value "VL" is switched to a second lower limit value "VWAIT", which is higher than the first lower limit value "VLa" (that is, the switch element "DC1" is turned off, and the switch element "DC2" is turned on).

As shown in FIG. 2, the lower limit value setting circuit "DC" includes a first limiting transistor "T1" and a first amplifier "AMP1", for example.

The first limiting transistor "T1" is connected to a power supply "VIN" at one end thereof and to the second node "N2" at another end thereof.

The first amplifier "AMP1" receives the comparison result signal "Vc" and a lower limit value "VL" and outputs a first controlling signal that controls a gate voltage of the first limiting transistor "T1" based on the comparison result signal "Vc" and the lower limit value "VL".

For example, if the comparison result signal "Vc" is higher than the lower limit value "VL", the first amplifier "AMP1" controls the gate voltage of the first limiting transistor "T1" so as to turn off the first limiting transistor "T1".

On the other hand, if the comparison result signal "Vc" reaches the lower limit value, the first amplifier "AMP1" controls the gate voltage of the first limiting transistor "T1" so as to turn on the first limiting transistor "T1".

In this way, the lower limit value setting circuit "DC" performs control to prevent the comparison result signal "Vc" from being lower than the lower limit value "VL".

As shown in FIG. 1, the upper limit value setting circuit "UC" sets an upper limit value "VH" for the comparison result signal "Vc" supplied to the second node "N2" and performs control to prevent the comparison result signal "Vc" from being higher than the upper limit value "VH".

As shown in FIG. 3, the upper limit value setting circuit "UC" includes a second limiting transistor "T2" and a second amplifier "AMP2", for example.

The second limiting transistor "T2" is connected to the fixed potential (the ground potential as described above, for example) at one end (a source) thereof and to the second node "N2" at another end (a drain) thereof.

The second amplifier "AMP2" receives the comparison result signal "Vc" and an upper limit value "VH" and outputs a second controlling signal that controls a gate voltage of the second limiting transistor "T2" based on the comparison result signal "Vc" and the upper limit value "VH".

For example, if the comparison result signal "Vc" is lower than the upper limit value "VH", the second amplifier "AMP2" controls the gate voltage of the second limiting transistor "T2" so as to turn off the second limiting transistor "T2".

On the other hand, if the comparison result signal "Vc" reaches the upper limit value "VH", the second amplifier "AMP2" controls the gate voltage of the second limiting transistor "T2" so as to turn on the second limiting transistor "T2".

In this way, the lower limit value setting circuit "DC" performs control to prevent the comparison result signal "Vc" from being higher than the upper limit value "VH".

That is, the output of the error amplifier "EA" can be limited within a certain range, and the comparison result signal "Vc" can be prevented from deviating from a control range.

As shown in FIG. 4, the switching controlling circuit "SWC" includes a first MOS transistor "M1", a second MOS transistor "M2", a current detecting resistor "R1", a current amplifier "CA", a current comparator "ICOMP", an oscillator "OSC" and a drive controlling circuit 3, for example.

The first MOS transistor "M" is connected to the power supply "VIN" at one end (a source) thereof via the current detecting resistor "R1" and to the first node "N1" at another end (a drain) thereof. In this embodiment, the first MOS transistor "M" is a pMOS transistor, for example.

The second MOS transistor "M2" is connected to the first node "N1" at one end (a drain) thereof and to the fixed potential (the ground potential as described above in this embodiment) at another end (a source) thereof. In this embodiment, the second MOS transistor "M2" is an nMOS transistor, for example.

As described above, the current detecting resistor "R1" is between the power supply "VIN" and the one end (the source) of the first MOS transistor "M".

The current amplifier "CA" outputs a current detection signal "VSW" that is responsive to the value of the current flowing through the current detecting resistor "R1". The current amplifier "CA" monitors a peak value, for example, of an inductor current flowing through the coil "L". That is, the current detection signal "VSW" has a value responsive to the inductor current.

The current comparator "ICOMP" receives the comparison result signal "Vc" and the current detection signal "VSW" and outputs a reset signal that is responsive to the result of comparison between the comparison result signal "Vc" and the current detection signal "VSW".

The oscillator "OSC" outputs a set signal (a signal at the "High" level, for example), which is an oscillated signal, every certain period of time.

The drive controlling circuit 3 is configured to output a controlling signal, which is a pulse signal, to gates of the first MOS transistor "M1" and the second MOS transistor "M2" in accordance with the set signal and to switch the on/off states of the first MOS transistor "M1" and the second MOS transistor "M2" in a complementary manner. Furthermore, the drive controlling circuit 3 controls the pulse duty cycle of the controlling signal in accordance with the reset signal.

As shown in FIG. 4, the drive controlling circuit 3 includes a flip-flop "FF", a logic circuit "3a" and drivers "PDR" and "NDR", for example.

The reset signal is input to a reset terminal "R" of the flip-flop "FF", and the set signal is input to a set terminal of the flip-flop "FF". The flip-flop "FF" outputs a signal responsive to the set signal and the reset signal at an output terminal "Q" thereof.

The logic circuit "3a" outputs the controlling signal to the gates of the first MOS transistor "M1" and the second MOS transistor "M2" via the drivers "PDR" and "NDR", which amplify a signal, in accordance with the output signal of the flip-flop "FF".

The switching controlling circuit "SWC" stops operation of at least any of the oscillator "OSC", the current comparator "ICOMP" and the current amplifier "CA" in response to the mode signal "VMODE" that prescribes the inactive mode described above. In particular, if operation of all of the oscillator "OSC", the current comparator "ICOMP" and the current amplifier "CA" is stopped, the power consumption can be further reduced.

In the DC-DC converter 1000 having the configuration described above, the pulse duty cycle is controlled by a feedback loop so that the divided voltage "VFB" and the reference voltage "VREF" agree with each other. Therefore, the output voltage "VOUT" can be set at a predetermined value by changing the resistance ratio of the voltage dividing circuit 1.

As described above, the DC-DC converter 1000 performs pulse width modulation (PWM) control using the set signal supplied from the oscillator "OSC" every certain period of time and the reset signal generated based on comparison between the voltages "VSW" and "Vc".

The error amplifier "EA", the filter circuit 2, the switching controlling circuit "SWC", the mode comparator "MC", the switch elements "MC1", "MC2", "DC1" and "DC2", the lower limit value setting circuit "DC" and the upper limit value setting circuit "UC" form a semiconductor integrated circuit 100 mounted on one chip. As described above, the semiconductor integrated circuit 100 is incorporated in the DC-DC converter 1000.

Next, an example of an operation of the DC-DC converter 1000 having the configuration described above in the case where the mode of the DC-DC converter 1000 changes from a light load mode to a normal mode will be described.

Figure 5:
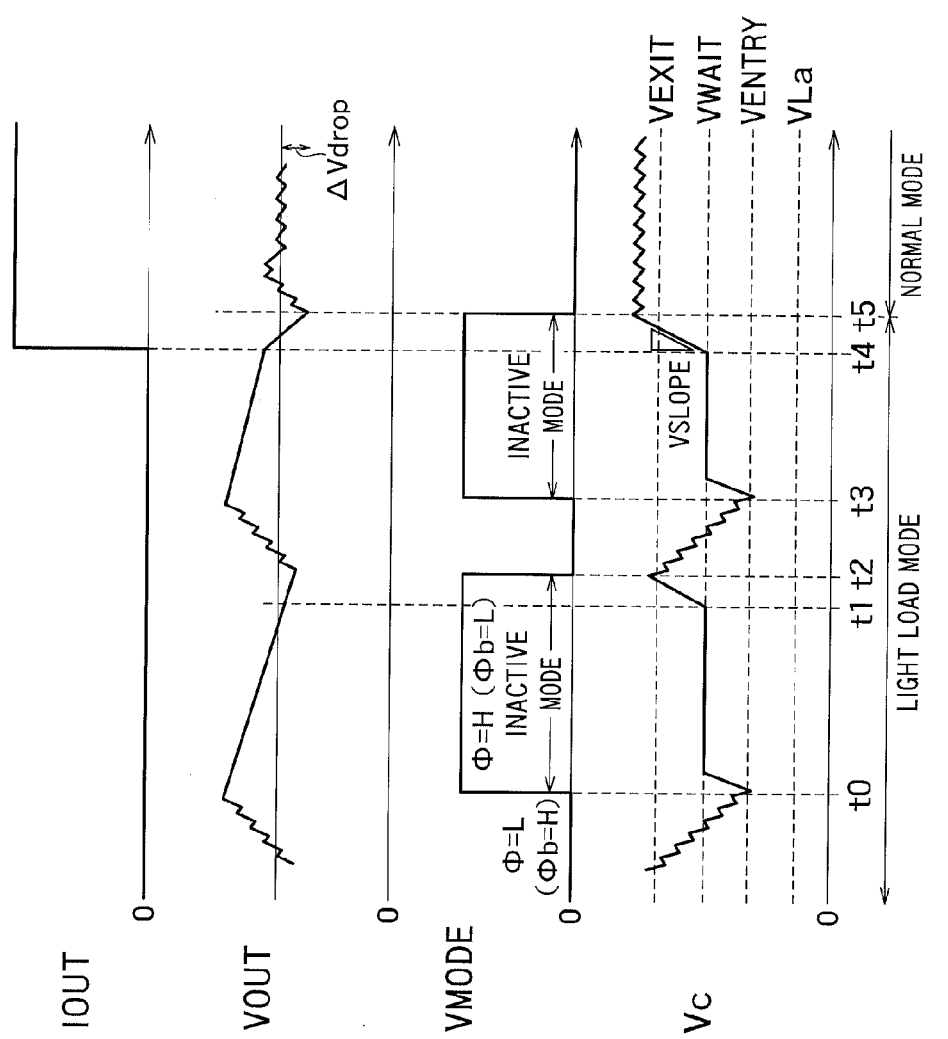
FIG. 5 is a waveform diagram showing an example of waveforms of signals in the DC-DC converter 1000 shown in FIG. 1.

FIG. 5 is a waveform diagram showing an example of waveforms of signals in the DC-DC converter 1000 shown in FIG. 1.

As shown in FIG. 5, the first lower limit value "VLa" is set lower than the first threshold "VENTRY". The first threshold "VENTRY" is set lower than the second lower limit value "VWAIT". The second lower limit value "VWAIT" is set lower than the second threshold "VEXIT".

For example, at a time "t0", when the comparison result signal "Vc" becomes lower than the threshold "Vth" (the first threshold "VENTRY"), the mode signal "VMODE" (the signal "43") is set at the "High" level (to prescribe the inactive mode).

In response to this, the switching controlling circuit "SWC" stops the operation of outputting the pulse signal. As a result, the output voltage "VOUT" starts decreasing.

At this point in time, the threshold "Vth" is switched to the second threshold "VEXIT". And the comparison result signal "Vc" is limited to the second lower limit value "VWAIT".

At a time "t2", when the comparison result signal "Vc" becomes equal to or higher than the threshold "Vth" (the second threshold "VEXIT"), the mode signal "VMODE" (the signal "Φ") is set at the "Low" level (to prescribe the active mode).

In response to this, the switching controlling circuit "SWC" starts the operation of outputting the pulse signal.

A load current "IOUT" is still low (which means a light load), so that the output voltage "VOUT" increases, and the comparison result signal "Vc" starts decreasing.

At a time "t3", when the comparison result signal "Vc" becomes lower than the threshold "Vth" (the first threshold "VENTRY"), the mode signal "VMODE" (the signal "Φ") is set at the "High" level (to prescribed the inactive mode).

In response to this, the switching controlling circuit "SWC" stops the operation of outputting the pulse signal. As a result, the output voltage "VOUT" starts decreasing.

At this point in time, the threshold "Vth" is switched to the second threshold "VEXIT". And the comparison result signal "Vc" is limited to the second lower limit value "VWAIT".

At a time "t4", the load current "IOUT" increases.

At a time "t5", when the comparison result signal "Vc" becomes equal to or higher than the threshold "Vth" (the second threshold "VEXIT"), the mode signal "VMODE" (the signal "Φ") is set at the "Low" level (and the mode changes from the light load mode to the normal mode).

In response to this, the switching controlling circuit "SWC" starts the operation of outputting the pulse signal.

As described above, as soon as the comparison result signal "Vc" becomes equal to or lower than the first threshold "VENTRY" and the mode comparator "MC" inverts the output signal at the time "t3", the lower limit value is set at the second lower limit value "VWAIT".

As a result, the load current "IOUT" increases at the time "t4", and the comparison result signal "Vc" can start increasing from a higher voltage value ("VWAIT") when the recovery from the light load mode to the normal mode occurs. That is, the period of time from the time "t4" to the time "t5" the DC-DC converter 1000 requires to start the switching operation is reduced.

Furthermore, during the inactive mode (from the time "t0" to the time "t2" and from the time "t3" to the time "t5"), there is no need to take care of the stability of the feedback loop in the active mode (from the time "t2" to the time "t3"), so that the resistance of the filter circuit 2 is set higher.

Since the resistance of the filter circuit 2 is set higher, the response rate of the comparison result signal "Vc" improves even if the driving capability of the error amplifier "EA" remains the same.

As a result, a voltage drop "ΔVdrop" of the output voltage "VOUT" decreases. Therefore, malfunction of an application to which the output voltage "VOUT" is supplied can be prevented.

As described above, the DC-DC converter according to this embodiment can increase the speed of recovery from the light load state and decrease the drop of the output voltage.

The magnitude relationship among the first and second thresholds and the first and second lower limit values is not limited to the relationship in the embodiment described above. For example, the second lower limit value "VWAIT" may be equal to or lower than the first threshold "VENTRY".

Second Embodiment

Figure 6:
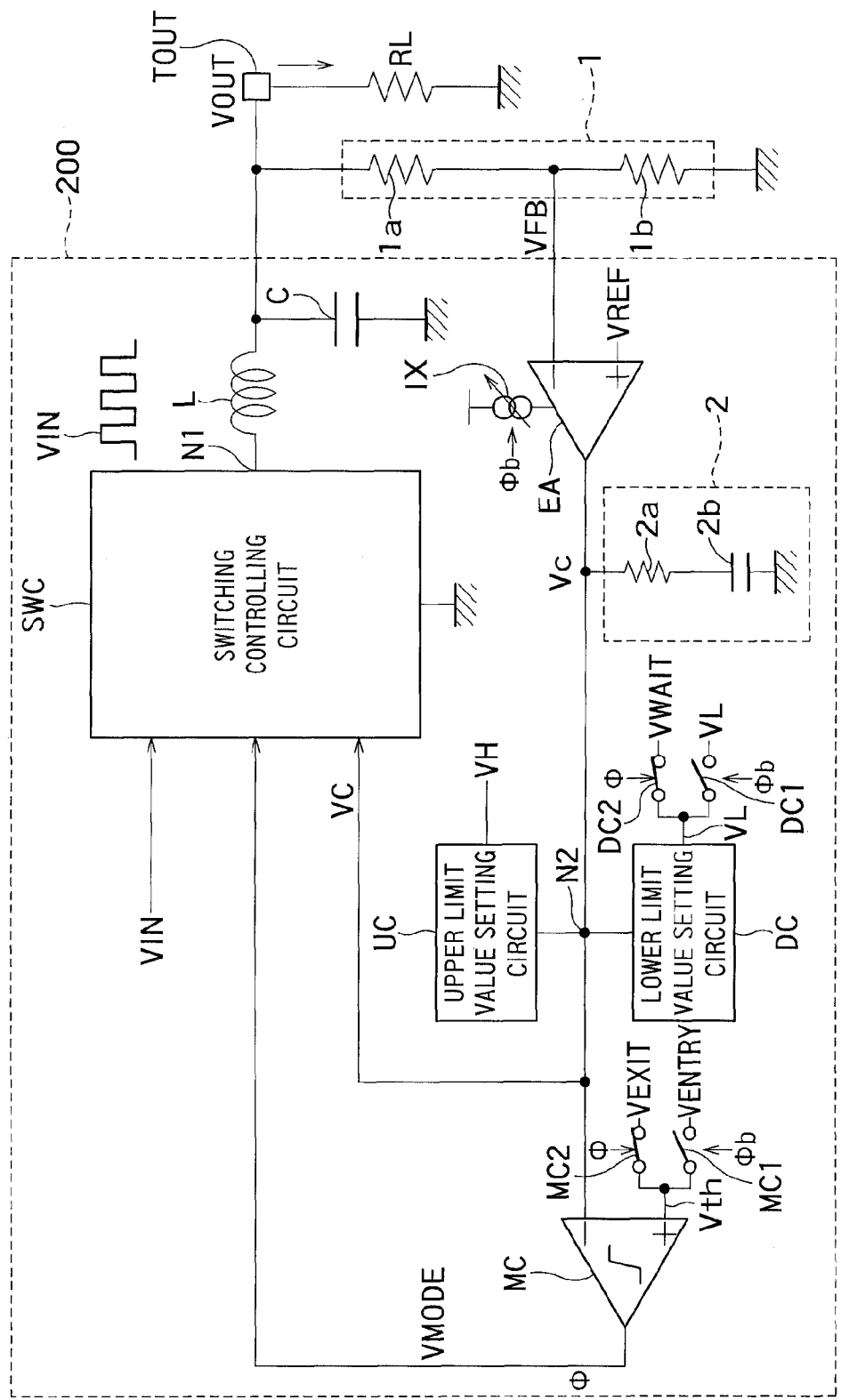
FIG. 6 is a block diagram showing an example of a configuration of a DC-DC converter 2000 according to a second embodiment.

FIG. 6 is a block diagram showing an example of a configuration of a DC-DC converter 2000 according to a second embodiment. In FIG. 6, the same reference symbols as those shown in FIG. 1 denote the same components as those in the first embodiment.

As shown in FIG. 6, as with the DC-DC converter 1000 according to the first embodiment, the DC-DC converter 2000 includes the coil "L", the capacitor "C", the voltage dividing circuit 1, the error amplifier "EA", the filter circuit 2, the switching controlling circuit "SWC", the mode comparator "MC", the switch elements "MC1", "MC2", "DC1" and "DC2", the lower limit value setting circuit "DC" and the upper limit value setting circuit "UC".

A driving current source "IX" controls a driving current for the error amplifier "EA" in accordance with the mode signal "VMODE" (the signal "VD"). In FIG. 1, the driving current source "IX" is omitted for the sake of simplicity.

For example, the driving current source "IX" sets the driving current at a first current value if the mode signal "VMODE" prescribes the active mode. That is, if the mode signal "VMODE" prescribes the active mode, the driving current for the error amplifier "EA" is switched to the first current value.

On the other hand, the driving current source "IX" sets the driving current at a second current value, which is higher than the first current value, if the mode signal "VMODE" prescribes the inactive mode. That is, if the mode signal "VMODE" prescribes the inactive mode, the driving current for the error amplifier "EA" is switched to the second current value, which is higher than the first current value.

Therefore, when the mode signal "VMODE" prescribes the inactive mode, the error amplifier "EA" has an increased driving capability (an improved response rate).

That is, the DC-DC converter 2000 can reduce the drop of the output voltage "VOUT" when a transition from the light load mode to the normal mode occurs.

The error amplifier "EA", the filter circuit 2, the switching controlling circuit "SWC", the mode comparator "MC", the switch elements "MC1", "MC2", "DC1" and "DC2", the lower limit value setting circuit "DC" and the upper limit value setting circuit "UC" form a semiconductor integrated circuit 200 mounted on one chip. The semiconductor integrated circuit 200 is incorporated in the DC-DC converter 2000.

The remainder of the configuration of the DC-DC converter 2000 is the same as that of the DC-DC converter 1000 according to the first embodiment.

That is, as with the DC-DC converter 1000 according to the first embodiment, the DC-DC converter 2000 according to the second embodiment can increase the speed of recovery from the light load state and decrease the drop of the output voltage.

The arrangement that changes the driving current for the error amplifier "EA" described with regard to the second embodiment may be applied to the DC-DC converter 1000 according to the first embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A DC-DC converter, comprising:
a coil connected to a first node, to which a pulse signal is supplied, at a first end thereof and to an output terminal at a second end thereof;
a capacitor that is connected between the second end of the coil and a first fixed potential;
a voltage dividing circuit that divides a voltage at the output terminal and outputs a resulting divided voltage;
an error amplifier that receives the divided voltage and a reference voltage, outputs a comparison result signal, which is responsive to a result of comparison between the divided voltage and the reference voltage, to a second node;

a filter circuit that is connected to the second node at a first end thereof and to the first fixed potential at a second end thereof, compensates for a phase of the comparison result signal output from the error amplifier;

a switching controlling circuit that controls a duty cycle of the pulse signal supplied to the first node so as to bring the voltage at the output terminal closer to a target value, based on the comparison result signal;

a mode comparator that receives the comparison result signal and a threshold, outputs a mode signal that prescribes an active mode in which the switching controlling circuit performs an operation of outputting the pulse signal, or the mode signal that prescribes an inactive mode in which the switching controlling circuit stops the operation of outputting the pulse signal, based on the result of comparison between the comparison result signal and the threshold, the mode comparator having a hysteresis characteristic; and a lower limit value setting circuit that sets a lower limit value for the comparison result signal supplied to the second node in accordance with the mode signal and performs control to prevent the comparison result signal from being lower than the lower limit value, and wherein in the lower limit value setting circuit, the lower limit value is switched to a first lower limit value, if the mode signal prescribes the active mode, on the other hand, the lower limit value is switched to a second lower limit value, which is higher than the first lower limit value, if the mode signal prescribes the inactive mode.

2. The DC-DC converter according to claim 1,
wherein the mode comparator outputs the mode signal that prescribes the active mode, if the comparison result signal increases to the threshold or higher,
on the other hand, the mode comparator outputs the mode signal that prescribes the inactive mode, if the comparison result signal decreases to the threshold or lower.

3. The DC-DC converter according to claim 1,
wherein the threshold is a first threshold, if the mode signal prescribes the active mode,
on the other hand, the threshold is a second threshold, which is higher than the first threshold, if the mode signal prescribes the inactive mode.

4. The DC-DC converter according to claim 3,
wherein the first lower limit value is lower than the first threshold, and
the first threshold is lower than the second lower limit value, and
the second lower limit value is lower than the second threshold.

5. The DC-DC converter according to claim 1,
wherein the filter circuit comprises:
a compensating resistor that is connected between the second node and the first fixed potential; and
a compensating capacitor that is connected in series with the compensating resistor between the second node and the first fixed potential.

6. The DC-DC converter according to claim 5,
wherein the compensating resistor is a variable resistor, and
wherein in the compensating resistor, a resistance is switched to a first resistance, if the mode signal prescribes the active mode, on the other hand, the resistance is switched to a second resistance, which is higher than the first resistance, if the mode signal prescribes the inactive mode.

7. The DC-DC converter according to claim 1,
wherein the lower limit value setting circuit comprises:
a first limiting transistor that is connected to a second fixed potential at one end thereof and to the second node at another end thereof; and
a first amplifier that receives the comparison result signal and the lower limit value and outputs a first controlling signal that controls a gate voltage of the first limiting transistor based on the comparison result signal and the lower limit value, and
wherein the first controlling signal turns off the first limiting transistor, if the comparison result signal is higher than the lower limit value,
on the other hand, the first controlling signal turns on the first limiting transistor, if the comparison result signal reaches the lower limit value.

8. The DC-DC converter according to claim 1, further comprising:
an upper limit value setting circuit that sets an upper limit value for the comparison result signal supplied to the second node and performs control to prevent the comparison result signal from being higher than the upper limit value.

9. The DC-DC converter according to claim 8,
wherein the second threshold is lower than the upper limit value, and
the first lower limit value is lower than the first threshold, and
the first threshold is lower than the second lower limit value, and
the second lower limit value is lower than the second threshold.

10. The DC-DC converter according to claim 8,
wherein the upper limit value setting circuit comprises:
a second limiting transistor that is connected to the first fixed potential at a first end thereof and to the second node at a second end thereof; and
a second amplifier that receives the comparison result signal and the upper limit value and outputs a second controlling signal that controls a gate voltage of the second limiting transistor based on the comparison result signal and the upper limit value, and
wherein the second controlling signal turns off the second limiting transistor, if the comparison result signal is lower than the upper limit value,
on the other hand, the second controlling signal turns on the second limiting transistor, if the comparison result signal reaches the upper limit value.

11. A semiconductor integrated circuit being incorporated in a DC-DC converter having a coil that is connected to a first node at one end thereof and to an output terminal at another end thereof, a capacitor that is connected between the another end of the coil and a first fixed potential, and a voltage dividing circuit that divides a voltage at the output terminal and outputs a resulting divided voltage, the semiconductor integrated circuit comprising:
an error amplifier that receives the divided voltage and a reference voltage, outputs a comparison result signal, which is responsive to a result of comparison between the divided voltage and the reference voltage, to a second node;
a filter circuit that is connected to the second node at a first end thereof and to the first fixed potential at a second end thereof, compensates for a phase of the comparison result signal output from the error amplifier;

a switching controlling circuit that controls a duty cycle of the pulse signal supplied to the first node so as to bring the voltage at the output terminal closer to a target value, based on the comparison result signal;

a mode comparator that receives the comparison result signal and a threshold, outputs a mode signal that prescribes an active mode in which the switching controlling circuit performs an operation of outputting a pulse signal, or the mode signal that prescribes an inactive mode in which the switching controlling circuit stops the operation of outputting the pulse signal, based on the result of comparison between the comparison result signal and the threshold, the mode comparator having a hysteresis characteristic; and a lower limit value setting circuit that sets a lower limit value for the comparison result signal supplied to the second node in accordance with the mode signal and performs control to prevent the comparison result signal from being lower than the lower limit value, and wherein in the lower limit value setting circuit, the lower limit value is switched to a first lower limit value, if the mode signal prescribes the active mode, on the other hand, the lower limit value is switched to a second lower limit value, which is higher than the first lower limit value, if the mode signal prescribes the inactive mode.

12. The semiconductor integrated circuit according to claim 11, wherein the mode comparator outputs the mode signal that prescribes the active mode, if the comparison result signal increases to the threshold or higher, on the other hand, outputs the mode signal that prescribes the inactive mode, if the comparison result signal decreases to the threshold or lower.

13. The semiconductor integrated circuit according to claim 11, wherein the threshold is a first threshold, if the mode signal prescribes the active mode, on the other hand, the threshold is a second threshold, which is higher than the first threshold, if the mode signal prescribes the inactive mode.

14. The semiconductor integrated circuit according to claim 13, wherein the first lower limit value is lower than the first threshold, and the first threshold is lower than the second lower limit value, and the second lower limit value is lower than the second threshold.

15. The semiconductor integrated circuit according to claim 11, wherein the filter circuit comprises:

a compensating resistor that is connected between the second node and the first fixed potential; and a compensating capacitor that is connected in series with the compensating resistor between the second node and the first fixed potential.

16. The semiconductor integrated circuit according to claim 15, wherein the compensating resistor being a variable resistor, and wherein in the compensating resistor, a resistance is switched to a first resistance, if the mode signal prescribes the active mode, on the other hand, the resistance is switched to a second resistance, which is higher than the first resistance, if the mode signal prescribes the inactive mode.

17. The semiconductor integrated circuit according to claim 11, wherein the lower limit value setting circuit comprises:

a first limiting transistor that is connected to a second fixed potential at one end thereof and to the second node at another end thereof; and a first amplifier that receives the comparison result signal and the lower limit value and outputs a first controlling signal that controls a gate voltage of the first limiting transistor based on the comparison result signal and the lower limit value, and wherein the first controlling signal turns off the first limiting transistor, if the comparison result signal is higher than the lower limit value, on the other hand, the first controlling signal turns on the first limiting transistor, if the comparison result signal reaches the lower limit value.

18. The semiconductor integrated circuit according to claim 11, further comprising:

an upper limit value setting circuit that sets an upper limit value for the comparison result signal supplied to the second node and performs control to prevent the comparison result signal from being higher than the upper limit value.

19. The semiconductor integrated circuit according to claim 18, wherein the second threshold is lower than the upper limit value, and the first lower limit value is lower than the first threshold, and the first threshold is lower than the second lower limit value, and the second lower limit value is lower than the second threshold.

20. The semiconductor integrated circuit according to claim 18, wherein the upper limit value setting circuit comprises:

a second limiting transistor that is connected to the fixed potential at a first end thereof and to the second node at a second end thereof; and a second amplifier that receives the comparison result signal and an the upper limit value and outputs a second controlling signal that controls a gate voltage of the second limiting transistor based on the comparison result signal and the upper limit value, and wherein the second controlling signal turns off the second limiting transistor, if the comparison result signal is lower than the upper limit value, on the other hand, the second controlling signal turns on the second limiting transistor, if the comparison result signal reaches the upper limit value.

* * * * *